[19] United States Patent [11] 3,631,878

[72] Inventor John Vander Horst
Lakewood, Colo.
[21] Appl. No. 835,542
[22] Filed June 23, 1969
[45] Patented Jan. 4, 1972
[73] Assignee Wilkerson Corporation
Englewood, Colo.

[54] PILOT-OPERATED FLUID PRESSURE REGULATOR
17 Claims, 7 Drawing Figs.

[52] U.S. Cl. .................................................. 137/116.3,
137/116.5
[51] Int. Cl. ................................................. G05d 11/00
[50] Field of Search ......................................... 137/116.3,
116.5

[56] References Cited
UNITED STATES PATENTS

| | | | |
|---|---|---|---|
| 2,963,040 | 12/1960 | Zimmer | 137/116.5 X |
| 2,981,280 | 4/1961 | Cornelius | 137/116.5 X |
| 3,240,223 | 3/1966 | Vander Horst | 137/116.5 |
| 3,425,434 | 2/1969 | Strickland et al. | 137/116.3 X |

Primary Examiner—Laverne D. Geiger
Assistant Examiner—David J. Zobkiw
Attorney—Anderson, Spangler & Wymore ABSTRACT: This invention relates to a pilot-operated fluid pressure control device that includes a main flow control valve and an actuating mechanism for the latter that includes a pilot section and a main section operatively and functionally interconnected by a common pilot control pressure chamber defined between a pair of pressure-responsive means mounted for independent relative reciprocating movement. The pilot section of the actuating mechanism houses one of the pressure-responsive means and it functions as an adjustable spring rest, the equilibrium position of which is determined by the location of an externally adjustable element of a three-element pilot control valve. Fluid pressure within the pilot control pressure chamber counterbalances the biasing force exerted on the pressure-responsive means within the pilot section by a spring, compressible elastic member or other biasing means acting against the opposite face thereof. The other pressure-responsive means is located within the main section with one face exposed to the control pressure in the pilot control pressure chamber and the other to the secondary or delivered pressure. An increase or decrease in the secondary pressure above or below that offset by the control pressure induces a response in the main section pressure-responsive means that closes or opens the main valve operatively connected thereto so that said secondary pressure is returned to and maintained at the preset level thus, once again, restoring equilibrium. An increase or decrease in secondary pressure also acts through the main section pressure-responsive means to bring about a corresponding change in the control pressure and it, in turn, actuates a three-way pilot control valve so as to bleed or add fluid to the pilot control pressure chamber to again establish the equilibrium. If the secondary pressure is still too high after the main flow control valve has closed, the pressure-responsive means within the main section functions as a relief valve to interconnect a controlled pressure chamber and an ambient pressure chamber thus dumping the excess fluid. The control pressure within the pilot control pressure chamber is selectively connected to both atmospheric pressure and the main upstream line pressure through the three-way valve which functions automatically to maintain the control pressure at a preset level.

FIG. 1.

INVENTOR
JOHN VANDER HORST

PATENTED JAN 4 1972 3,631,878

INVENTOR
JOHN VANDER HORST
BY
ATTORNEYS

FIG. 7.

PILOT-OPERATED FLUID PRESSURE REGULATOR

Fluid pressure regulators are, of course, notoriously old in the art as are pilot-operated versions thereof. The latter fall into two general types, the first of which is little more than a regulator on a regulator and the second, while still using two regulators, interconnects them in such a way that they are interdependent and one cannot operate without the other. Both types have the advantages of eliminating the loss of spring load due to the stroke and ease of adjustment because of the lighter spring that can be used. The second or "feedback"-type pilot-operated regulator has the additional advantage of a much better response to fluctuations in flow.

As far as disadvantages are concerned, both types give superior performance if a small amount of fluid is bled off the pilot section and exhausted to the atmosphere which, of course, is wasteful and noisy. Also, most existing designs of pilot-operated regulators are exceedingly complex and expensive. Probably the most significant disadvantage, however, is one that is shared by virtually all of the prior art pressure regulators and is not, therefore, confined to those of the pilot-operated type, namely, the inability to know in advance what the delivered pressure is going to be. Even a pressure gauge on the downstream side of the regulator does not solve this problem as it merely shows the existing delivered or secondary pressure without indicating in advance what it will be.

Since this secondary pressure is of unknown magnitude until it is already in the line containing the pressure gauge, it constitutes a hazardous condition for both personnel and equipment. The conventional practice, therefore, is to turn the regulator all the way off or nearly so before admitting primary line pressure to the regulator inlet and then bring the secondary pressure up to the working level slowly while monitoring same on the pressure gauge. This, obviously, is a time-consuming and troublesome operation that could be avoided if one were able to set and rely upon the regulator to deliver any selected secondary pressure. Add to this some means for limiting the setting to a predetermined maximum and one approaches the ideal regulator.

It has now been found in accordance with the teaching of the instant invention that these and other shortcomings of the prior art regulators, both pilot-operated and otherwise, can be eliminated by adjusting one element of a three-way valve such that its location governs the magnitude of the control pressure existing within a pilot control pressure chamber formed between a pair of pressure-responsive means mounted for relative reciprocating movement. The control pressure existing within the pilot control pressure chamber is automatically maintained by the three-way valve at a substantially constant level irrespective of fluctuations in the primary pressure. The secondary or working pressure is, likewise, maintained substantially constant by instantaneously compensating for variations in downstream demands. The structure of the valve is such that an indicating means connected to the adjustable element of the pilot control valve can be moved in relation to a calibrated dial so as to set the regulator to deliver any desired secondary pressure and maintain same with the same degree of accuracy as that provided by any of the better prior art commercially available regulators. By being able to preset the delivered pressure, there is no necessity for turning off the regulator while pressurizing the inlet in order to protect the downstream equipment from damage. The need for a pressure gauge reading the secondary or delivered pressure is, likewise, eliminated.

The construction of the main flow control valve actuating mechanism is such that the pilot and main sections thereof can either be encased in a common unitary housing or separated from one another in two different housings. In the latter case, a conduit is provided that interconnects the two sections of the pilot control pressure chamber found within the separate housings so as to maintain the same constant control pressure in each.

The constant bleed associated with the better prior art pilot-operated regulators is eliminated without sacrificing performance and, of course, without wasting fluid. The improved regulator forming the subject matter hereof exhibits a remarkable lack of sensitivity to changes in primary pressure as well as providing a high reverse flow at a very low increase in downstream pressure.

Accordingly, it is the principal object of the present invention to provide a novel and improved pilot-operated fluid pressure control device.

A second objective is the provision of a device of the type aforementioned which does away with the necessity for providing a constant bleed while, at the same time, remaining highly sensitive and responsive to changes in flow.

Another objective of the invention herein disclosed and claimed is to provide a pressure regulator incorporating means for setting the secondary pressure at a predetermined value and maintaining this preset level substantially constant throughout fluctuating demand patterns and changes in primary pressure.

Still another object is the provision of a pressure regulator having a pressure-responsive control mechanism that includes both a pilot section and a main section which can either be encased in a common housing or separated from one another and functionally interconnected by fluid lines.

An additional object of the invention forming the subject matter hereof is to provide a regulator that gives the user a visual indication of delivered pressure without requiring a conventional pressure gauge and at no greater margin of error than that exhibited by the ordinary industrial gauge.

Further objects of the invention are to provide a pilot-operated pressure regulator that is compact, rugged, easy to operate, simple to service and repair, versatile, readily adaptable to various operating conditions, relatively inexpensive and even decorative in appearance.

Other objects will be in part apparent and in part pointed out specifically hereinafter in connection with the description of the drawings that follows and in which.

Figure 1:
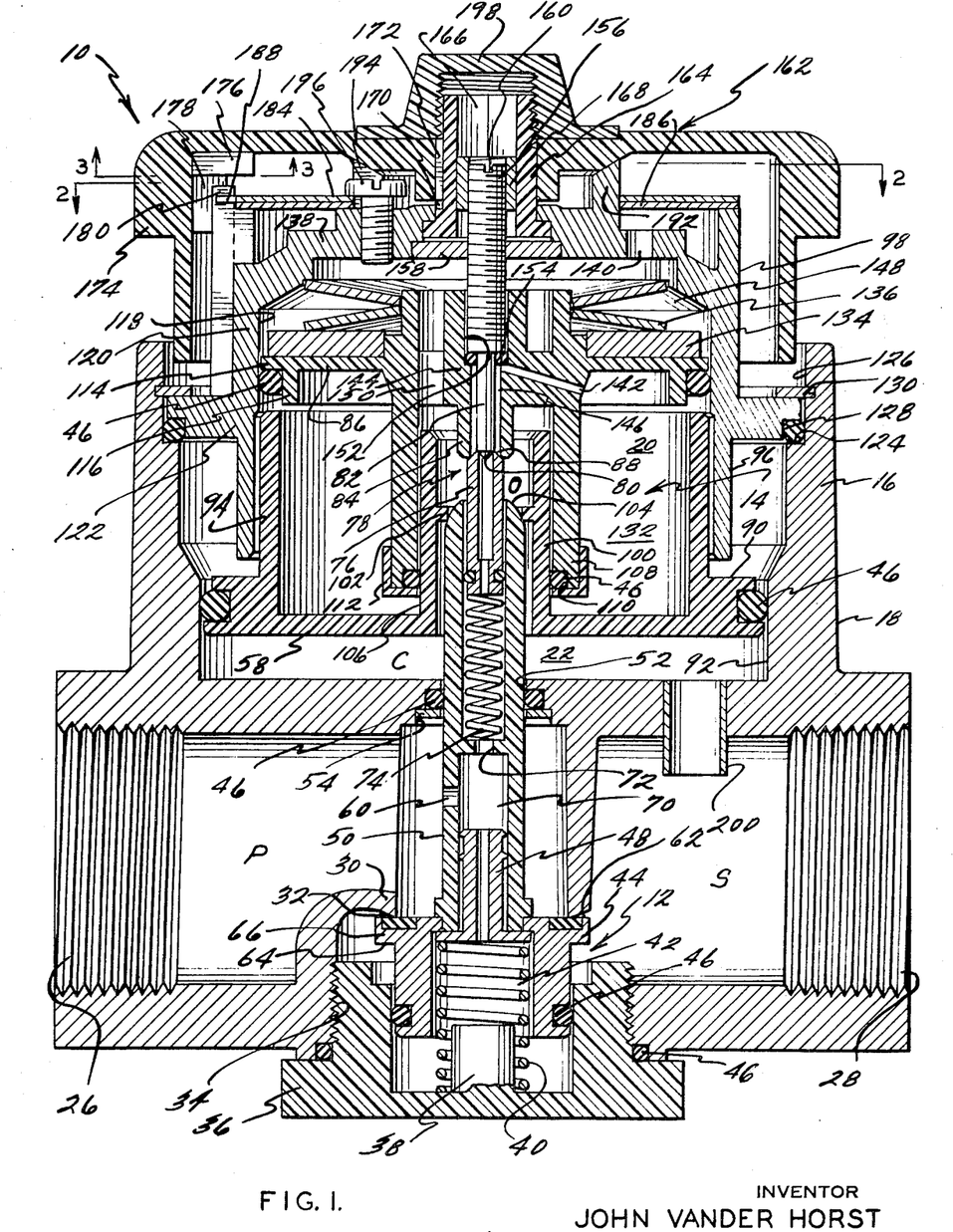
FIG. 1 is a diametrical section taken along the common axis of the main flow control valve and three-way pilot control valve.

Referring now to the drawings for a detailed description of the present invention and, initially, to FIG. 1 for this purpose, reference numeral 10 has been employed to broadly designate the regulator in its entirety which will be seen to include a main flow control valve mechanism and an actuating mechanism for the latter that have been similarly designated by reference numerals 12 and 14, respectively. In the particular form shown in FIG. 1, the entire valve actuating mechanism 14 is housed within the upstanding open-topped cup-shaped walled cavity 16 of the valve body 18; whereas, in the modified version of the regulator 10m shown in FIG. 7, and which will be described in detail later, the pilot section 20 of mechanism 14 is separated from the main section 22 thereof and housed in a separate body 24.

The main flow control valve mechanism 12 is of conventional design and includes an inlet 26 defining a primary pressure chamber "P" connectable to a source of fluid under pressure and an outlet 28 defining a secondary pressure chamber "S" connectable to a service line containing one or more fluid-operated components (not shown) of various well-known types. Intermediate the primary and secondary pressure chambers which, in the particular form shown, are arranged coaxially, is located the main valve seat 30 that provides a continuous annular sealing surface 32 facing downwardly toward an internally threaded opening 34 in the bottom of the body 18. A removable plug 36 screwed into the opening in the valve body has an upstanding spring guidepost 38 in the center thereof that receives one end of compression spring 40. The other or upper end of the spring 40 seats in a recess 42 formed in the underside of valve element 44 and functions to normally bias the latter into fluidtight sealed engagement with the seat 30. Both the plug and valve element are provided with the usual O-ring seals 46 as shown.

The shank of a rivet 48 passing upwardly through an opening in the top of the valve element and into the hollow interior of valve stem 50 is used to fasten the latter elements together into a unitary assembly and also to form an abutment for the upper end of main valve spring 40. Valve stem 50 is mounted for reciprocating movement within an opening 52 in the top of valve body 18 where a continuous annular fluidtight seal is formed by O-ring 46 and ring fastener 54. The upper extremity of the stem projects well up into the walled cavity 16 and a downwardly directed force must be exerted thereon by spring 74 and lower piston 58 which comprises the first pressure-responsive means of the valve actuating mechanism 14 of sufficient magnitude to overcome the opposing bias of main valve spring 40. Since rivet 48 has a passage therethrough that receives primary pressure through port 60 in the side of the valve stem and delivers same to the underside of the valve element 44, and the opposed areas acted upon by said primary pressure above and below said valve element are essentially equal, any differential force across the valve element due to the primary pressure is so small as to be inconsequential especially when compared with the much greater force exerted by spring 40. The same thing is true of the secondary pressure because the upwardly facing area 62 on top of the valve element 44 exposed to said secondary pressure is essentially equal to the opposed area 64 underneath annular flange 66. Here again, any differential force across flange 66 due to the secondary pressure is nonexistent or, at most, minimal and can be disregarded when compared with the force exerted by spring 40. Accordingly, it is the force exerted by piston 58 on the valve stem 50 that remains the primary factor responsible for opening the main valve and this force is essentially constant regardless of the fluctuations in primary pressure. The resultant force opposing the normal bias exerted by valve spring 40 is the sum of the force exerted by spring 74 and the force produced as a function of the differential pressure across piston 58.

In the particular form shown, the axial opening 70 extending from end-to-end of the stem 50 is interrupted by an internal annular rib 72 that defines an upwardly facing shoulder functioning as an abutment for the lower end of compression spring 74. The upper end of this same spring engages and biases the second element 76 of the three-way pilot valve that has been broadly designated by reference numeral 78 up against the seat 80 formed on the lower end of the adjustable first element 82 thereof. The third element of the three-way pilot valve 78 comprises a tubular skirt 84 formed as a part of upper piston 86 which comprises the second pressure-responsive means of the valve actuating mechanism 14 that seats against the frustoconical surface 88 on the upper end of the aforementioned second element 76.

The lower piston or first pressure-responsive means 58 is encircled by an annular rib 90 containing an O-ring groove into which an O-ring seal is fitted that rides in fluidtight sealed contact against cylindrical surface 92 on the inside of the walled cavity 16. In the particular form shown, piston 58 includes an upstanding annular flange 94 that extends up inside of a corresponding annular skirt 96 that forms a part of bonnet 98. The aforementioned flange telescopes loosely inside the skirt so as to normally leave an annular space therebetween. Flange 94 provides an annular abutment positioned to engage the O-ring 46 encircling the upper piston or second pressure-responsive means so as to hold said O-ring in place during assembly.

At the center of the lower piston or first pressure-responsive means 58 is an upstanding tubular hub 100 which fits loosely over the stem 50 and carries an inwardly projecting annular rib 102 that engages the rounded upper extremity 104 of the latter. It will be readily apparent from an examination of FIG. 1 that as the lower piston 58 moves downwardly the rib 102 projecting from its hub 100 will force the stem 50 down and open the main valve 12 so as to pass fluid therethrough. The main valve spring 40 and the pressure in the pilot control pressure chamber 132 oppose one another and cooperate to maintain the rib 102 and the rounded end 104 sealed until the secondary pressure within the controlled pressure chamber "C" is sufficient to raise the lower piston 58 and unseat same from the stem after the main valve has closed thereby dumping fluid from said controlled pressure chamber into the ambient pressure chamber "O" which is at atmospheric pressure.

Now, the outside cylindrical surface 106 of the lower piston hub 100 telescopes up into the inner cylindrical surface of a downwardly extending tubular wall member 108 of the upper piston 86 where an O-ring forms a fluidtight seal therebetween. As illustrated, one wall of the O-ring groove 110 is defined by a removable cap 112 that fits over the free end of wall 108. The circumferential margin of the upper piston 86 carries both an annular rib 114 and shallow skirt 116 that cooperate to retain O-ring 46 in fluidtight sealed contact with the inner cylindrical surface 118 of the bonnet 98. The underside of the O-ring on the upper piston need not be retained because the pressure exerted thereon by the fluid in the pilot control pressure chamber acts to continuously bias it up against flange 114.

Bonnet 98 has an inverted generally cup-shaped configuration, the sidewall 120 defining cylindrical sealing surface 118 which is a continuation of walled cavity 16. The sidewall 120 has an annular rib 122 projecting therefrom that rests atop a shoulder 124 provided for the purpose on the inside of walled cavity 16. This shoulder and the adjoining cylindrical wall surface 126 cooperate with the step 128 in rib 122 to retain an O-ring which provides a fluidtight seal therebetween. Surface 126 also includes a snap ring groove adapted to receive snap ring 130 that holds the bonnet 98 in assembled relation inside the walled cavity 16 of the valve body 18. With the upper piston in fluidtight sealed relation against the interior cylindrical surface 118 of bonnet 98 and the outside surface of the lower piston hub, and both the lower piston 58 and bonnet making a continuous annular fluidtight seal against the walled cavity 16, these elements cooperate with one another to define the pilot control pressure chamber 132. Lower piston 58 moving in fluidtight sealed relation inside walled cavity 16 defines a first piston cylinder type pneumatic servomotor operative to control the main flow control valve and relieve excess pressure in the controlled pressure chamber when the latter valve is closed.

A bearing plate 134 has been shown on top of the upper piston 86 and a biasing element in the form of a Belleville washer subassembly 136 is located between the latter and the top 138 of the bonnet 98 which is in opposed relation thereto. The function of the Belleville washer subassembly is, of course, to urge the upper piston 86 downwardly away from the top 138 of the bonnet, this function being one that can be performed by many other types of biasing elements. Once again, a situation exists wherein the upper piston 86 cooperates with the inside cylindrical surface 118 of bonnet wall 120 and Belleville washer subassembly 136 to define a second piston cylinder type pneumatic servomotor functioning in pilot control relation to said first servomotor. Both of these servomotors operate within the same walled cavity because, functionally, the inside cylindrical surface 118 of the bonnet comprises a continuation of walled cavity 16 of the valve body.

A port 140 in the top of the bonnet is open to the atmosphere and provides the means for exhausting fluid from the pilot control pressure chamber as it escapes through passage 142 in the hub 144 of the upper piston, into the annular space 146 between elements 82 and 84 of the three-way valve 78, and from the latter annular space out into the biasing element cavity 148 through exhaust port 150 in the upper piston hub. Ports 150 and 140 are also the means to exhaust excess fluid dumped from the controlled pressure chamber C.

The construction of the upper piston hub 144 is somewhat complex. It has an axial opening therethrough that loosely accepts element 82 of the three-way valve and cooperates therewith to define the annular exhaust passage 146, mentioned previously that opens into ambient pressure chamber "O." Third element 84 of the three-way valve 78 is actually an integrally formed tubular extension of the hub 144 that projects therebeneath in coaxial relation. The same is true of tubular wall member 108 which, once again, comprises an integral extension of the hub that extends downwardly therefrom in radially spaced coaxial relation to third valve element 84 although considerably longer than the latter. The annular area of the hub between the aforementioned elements 84 and 108 contains the exhaust port 150 which also communicates with the interior of ambient pressure chamber "O."

Annulus 146 opens out into a cylindrical enlargement 152 separated therefrom by a shoulder 154 upon which an O-ring is seated that forms an annular fluidtight seal around the adjustable first valve element 82. The head of valve element 82 comprises an elongate threaded portion 156 which rises well above the top of the upper piston. Its threaded surface does not contact cylindrical enlargement 152 and first valve element 82 can, therefore, move up and down independently of piston 86 and vice versa.

A nut 158 is fastened in recessed relation to the underside of the bonnet 98 and the threaded section 156 of valve member 82 is screwed therein for axially adjustable movement relative to the other two elements 76 and 84 of the three-way valve 78. Valve member 82 has been shown provided with a kerf 160 into which a screwdriver is inserted to adjust same axially as will be described in detail presently.

Figures 2, 3:
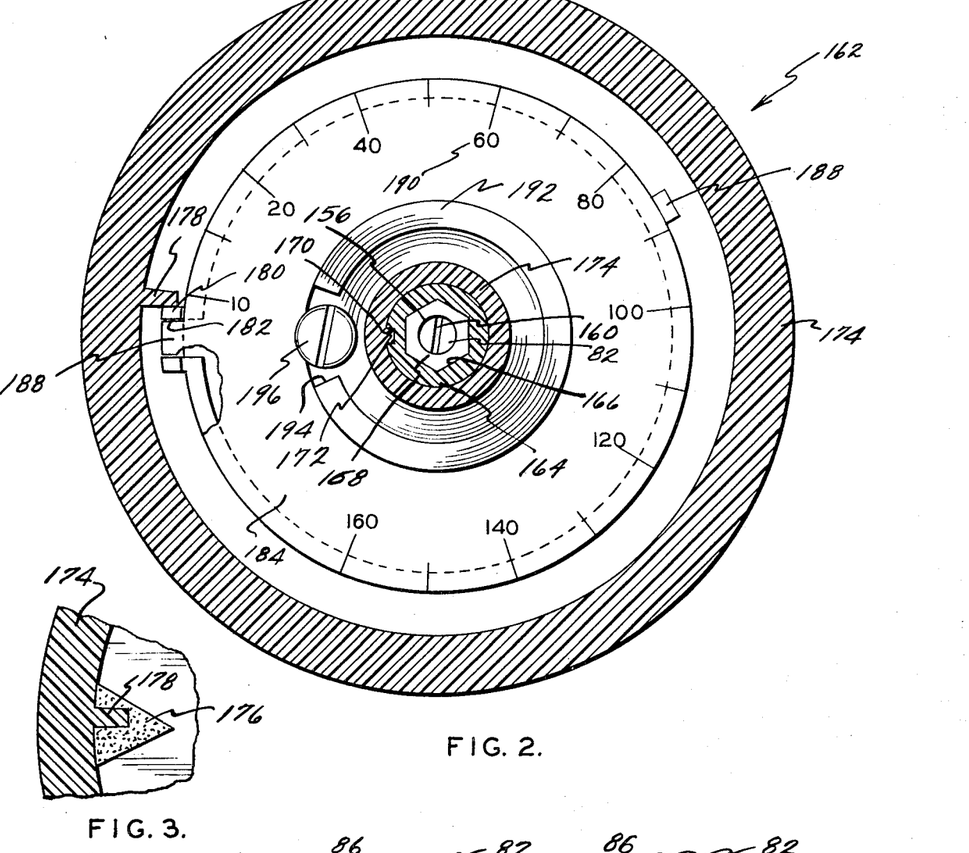
FIG. 2 is a horizontal section taken along line 2—2 of FIG. 1 showing a portion of the two stacked disks broken away to reveal the supporting surface of the bonnet therebeneath.
FIG. 3 is a fragmentary section to an enlarged scale showing the index mark and stop on the rotatable indicating means.

The unique construction of the instant regulator is such that a control knob and dial subassembly that has been indicated in a general way by reference numeral 162, can be employed to set the delivered pressure at any predetermined value in accordance with a scale calibrated directly in secondary pressure readings or the equivalent thereof. FIGS. 1-3, inclusive, to which reference will now be made, most clearly reveal the details of construction of the aforementioned subassembly 162. Carried by the bonnet 98 for relative rotational movement about its axis is an externally flanged member 164 having, in the particular form shown, an axially disposed hexagonal opening 166 therethrough. A hexagonal nut 168 sized to thread onto the threaded section 156 of valve element 82 is mounted within the hexagonal opening 166 for rotational movement with element 164. A vertically disposed groove 170 on the outside of element 164 receives the tongue 172 projecting into the axial opening in control knob 174, thus interlocking same for conjoint rotation. This control knob, in the particular form shown, is molded from a suitable transparent material and carries indexing indicia 176 adjacent its outer peripheral margin visible through the top thereof. A downwardly extending stop forming rib 178 movable with the control knob 174 emerges from the underside of the indexing indicia in position to contact one or the other of the fixed stop forming members 180 carried by the bonnet 98 and projecting therefrom in angularly spaced relation to one another so as to leave a gap 182 therebetween (FIG. 2).

Stacked atop the bonnet 98 are a pair of disks 184 and 186, both of which carry ears 188 projecting radially from the peripheral margin thereof. The upper of the two disks 184 has inscribed thereon a scale 190 (FIG. 2) that is calibrated in accordance with the delivered or secondary pressure existing at any selected rotational position of the control knob. Since the deflection curve for the Belleville washer unit is reasonably close to being linear, the scale markings assume an almost uniform spacing. The scale, once determined, can be used on each regulator and they need not be separately calibrated to fall well within the three percent deviation found acceptable in most industrial pressure gauges. Also, since it takes a force of several hundred pounds to deflect the Belleville washer subassembly only a few thousandths of an inch, less than one complete revolution of the control knob acting through adjustable valve element 82 and the upper piston is sufficient to bring about enough deflection thereof to encompass a range of pressures from atmospheric up to several hundred p.s.i.

The ear or tab 188 on the upper disk is located within the gap 182 left between the fixed stops 180 so as to align the indexing indicia 176 with a particular low reading on the scale which, of course, may be zero in order to provide a so-called "gauge pressure reading" or an average ambient pressure to provide an "absolute" reading. Now, if the secondary pressure can, without damage to downstream equipment or personnel, be operated at the maximum regulated pressure available at the regulator outlet, the ear 188 on the lower disk 186 can either be aligned with that of the upper disk and placed within gap 182 or located at some other preselected "minimum" reading other than zero. If, however, as is often the case, one wishes to limit the secondary pressure to a level below the maximum available at the outlet of the regulator, then the ear 188 of the lower disk can be rotated as shown in FIG. 2 ahead rather than behind stop forming rib 178 to a point adjacent said selected limiting pressure reading on the scale 190 carried by said upper disk. When this is done, the stop 178 on the control knob will strike the adjustable stop formed by the lower disk ear 188 and thus prevent the regulated secondary pressure from being set above a predetermined limited value.

The control knob rests atop and turns upon an upstanding annular flange 192 formed as a part of bonnet 98. This flange is interrupted at one point to provide a gap 194 for the placement of a setscrew 196 that is threaded into the top of the bonnet. The head of this setscrew is wide enough to project over onto the disks 184 and 186 as shown and provides means for releasably fastening same in any selected adjusted position such as that of FIG. 2.

Another unique feature of the control knob and dial subassembly should be mentioned, namely, the ability to rotate the entire subassembly relative to the valve body so that scale readings can be placed in any desired position for easy reading regardless of how the regulator is installed. Note in connection with FIGS. 1, 2 and 7 that with control knob stop 178 abutting the bonnet stop 180 as shown in FIG. 2, the control knob, disks, setscrew, first and third elements of the pilot control valve, Belleville washer subassembly, upper piston, bonnet and other incidental elements associated with the latter can be turned counterclockwise relative to the valve body, lower piston, second element of the pilot control valve and main valve stem without changing the functional relationships therebetween at all. With stop 178 against stop 180, the fluid in the pilot control pressure chamber is at ambient pressure so that the above-described elements can turn easily against snap ring 130 and the adjacent O-ring.

The kerf 160 of the adjustable valve element 82 is, of course, accessible through the central opening in the top of the control knob. At this point, threaded section 156 of valve element 82 can be screwed up or down in nut 158; however, nut 168 is free to rotate thereon and the position of this valve element is unaffected by rotation of the control knob. In order to link up the control knob to the control valve 78, one must set the indexing indicia carried by the former element to a given delivered pressure as indicated on scale 190 and, with the regulator connected in a high-pressure fluid line, adjust the adjustable valve element 82 until the secondary pressure available at the regulator outlet equals the selected scale pressure as determined by a downstream pressure gauge used for calibrating purposes. A drop of adhesive on the head of the adjustable valve element will usually suffice to connect it to nut 168 for conjoint rotation and the scale reading can be checked against the actual pressure at a couple of other points before connecting these two elements together permanently. When this is done, the control knob can be removably fastened to the unit by screwing cap nut 198 onto the externally threaded upper end of flanged member 164. The control knob can be removed at any time by first unscrewing the cap nut in order to have access to the setscrew 196 and disk 186. Of course, once the regulator is set at the factory to deliver the preset pressure shown on the scale, the supplementary pressure gauge is no longer needed except, perhaps, for an occasional check on the accuracy of the regulator.

Figure 7:
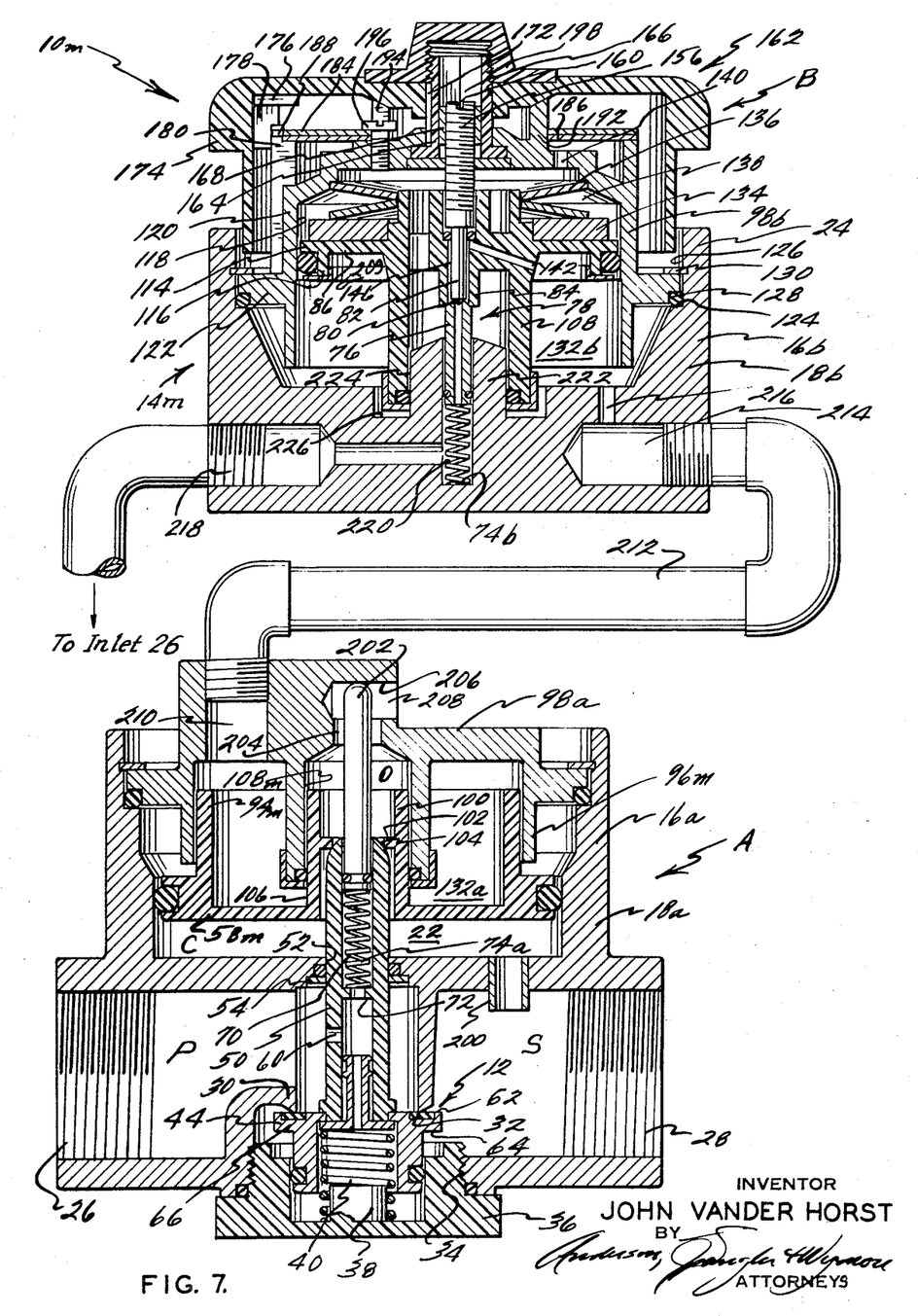

Before turning to the operation of the regulator, it would seem logical to examine the structure of the modified form thereof shown in FIG. 7 and identified by reference numeral 10m because both forms operate exactly the same in all essential respects. The valve body is separated into two sections 18a and 18b, thus defining a main regulator section indicated broadly by reference letter "A" connectable into the main fluid line (not shown) and a remotely controlled pilot regulator section "B." Valve body section 18a is substantially identical to valve body 18 of FIG. 1 modification except for a few dimensional changes having no functional significance. Section 22 of the modified pressure-responsive valve actuating mechanism 14m remains unchanged and is located within valve body section 18a. The controlled pressure chamber "C" beneath the lower piston 58m communicates with the secondary pressure chamber "S" on the downstream side of the main flow control valve mechanism 12 by means of siphon tube 200 which is also found in the FIG. 1 unit. The main flow control valve mechanism 12, is likewise, unchanged; however, instead of element 76 of three-way valve 78 emerging from the hollow valve stem 50, a simple solid plug 202 is substituted therefor. Plug 202 is sealed inside the hollow core 70 of stem 50 by an O-ring in the same manner as three-way valve element 76 and is biased upwardly by spring 74a. It is evident from an examination of FIG. 7 that modified bonnet section 98a sealed inside walled cavity 16a of valve body section 18a has an opening 204 in the top thereof located to loosely receive the upper end of the plug, an overhanging stop forming portion 206 that engages the top of the plug to keep it in the stem, and a side opening exhaust port 208 allowing fluid which has been dumped from the controlled pressure chamber "C" by the lower piston 58 being raised from its seat 104 on the valve stem to be exhausted to ambient pressure chamber "D" and then into the atmosphere.

Both sections 18a and 18b of the valve body are provided with cup-shaped walled cavities identified by reference numerals 16a and 16b, respectively. Walled cavity 16a is, for all practical purposes, identical to walled cavity 16 of the FIG. 1 modification and the lower piston 58m and bonnet section 98a occupy the exact same structural and functional relationships thereto as the corresponding elements 58 and 98 of the previously described regulator unit except for the retention of the upper piston O-ring as noted hereafter. Since the upper piston 86 is relocated in valve body section 18b and is no longer present in section 18a, the downwardly extending tubular wall member 108m into which cylindrical surface 106 of the lower piston hub 100 telescopes is formed as an integral part of bonnet 98a and, for this reason, is stationary rather than movable as was the case with the corresponding element 108 of the upper piston hub. Also, since the lower piston is no longer located in valve body 18b, its upstanding annular flange 94 is unavailable to hold the O-ring on the upper piston in place during assembly.

A port 210 is provided in the top of bonnet section 98a into which is connected one end of conduit 212, the other end of the latter being connected into a corresponding port 214 in the other section of the valve body 18b. The latter port communicates the interior of the valve body walled cavity 16b through passage 216. Cap forming section 98b is, once again, substantially identical to its counterpart 98 of the FIG. 1 modification and it is fastened and sealed in fluidtight relation within walled cavity 16b of valve body section 18b so as to cooperate therewith and with upper piston 86 to define a fluidtight interior chamber 132b. On the other hand, the lower piston 58m cooperates with the walled cavity 16a of its valve body section 18a and bonnet section 98a to define fluidtight chamber 132a. Conduit 212 interconnects these two chambers and it cooperates therewith and with passage 216 to define the pilot control pressure chamber which, in the previously described modification, was all housed within a single valve body 18.

The only changes worth noting in the pilot section "B" are in the valve body section 16b. An inlet passage 218 connectable to the high-pressure side of the main fluid line (not shown) opens into an axial bore 220 which contains spring 74b and second element 76 of the three-way valve 78. This spring biases second valve element 76 upwardly into the exact same functional relationship with elements 82 and 84 of the three-way valve 78 as was the case with the FIG. 1 modification, the only difference being that the valve stem 50 housing same was movable in the latter unit, whereas, in the instant modification (FIG. 7) the abutment for the spring is stationary. Since the lower piston 58 is in the main section "A" of the regulator, the outer cylindrical surface 106 of its hub 100 is not available to telescope up inside tubular wall member 108 of the upper piston and provide a guide therefor. In the FIG. 7 modification, this function is performed by upstanding annular guide member 222, the outer cylindrical surface 224 of which guides and seals against the inner cylindrical surface of wall member 108. In the particular form shown, annular groove 226 at the base of this guide member accommodates the lower end of wall 108 and enables the bonnet 16b to be foreshortened slightly so as to make a more compact unit.

Referring next to FIGS. 1, 4, 5 and 6 for a description of the operation of the regulator, it will be assumed that the primary pressure chamber "P" is connected to a source of fluid under pressure, a delivery line having one or more fluid-consuming tools or the like connected therein is attached to the secondary pressure chamber "S," and the control knob is set at "zero" or the equivalent scale reading representing the condition where only ambient pressure exists in the delivery line. Turning the control knob clockwise as viewed from above until the indicating indicia 176 is opposite the desired delivered pressure causes adjustable first valve element 82 of the three-way valve to move upward a small fraction of an inch from the equilibrium position of FIG. 5 into the position shown in FIG. 4 as the threaded section 156 thereof turns within nut 158. At this point, of course, hex nut 168 has been soldered, glued, brazed or otherwise fastened to the threaded section of first valve element 82 for conjoint rotation therewith and with the control knob and tubular element 166. As soon as first valve element 82 is screwed up some portion of one complete turn, its conical end 80 raises away from the frustoconical seat 88 of second valve element 76 of the three-way valve which remains in the same position due to its pressing against the third element 84 which, while movable, has not yet moved. Once first valve element 82 has moved off second valve element 76, fluid from the high-pressure side of the main valve 12 enters the pilot control pressure chamber 132 by passing through port 60 into the hollow valve stem 50, past spring abutment 72, up through the axial opening in element 76 and into annular space 146 before finally entering passage 142. As the pressure begins to rise in the pilot control pressure chamber 132, the upper and lower pistons 58 and 86 move apart slightly. As piston 58 moves downwardly, annular rib 102 inside the hub thereof will press down upon the rounded end 104 of the main valve stem 50 and open the main valve 44 thus allowing fluid to flow into the delivery line. Siphon tube 200 adjacent the outlet 28 is, of course, admitting the delivered or secondary pressure from the secondary pressure chamber into the controlled pressure chamber on the underside of the lower piston 58. Meanwhile, the upper piston 86 is being forced upwardly by fluid pressure in the pilot control pressure chamber against the bias exerted on top thereof by Belleville washer subassembly 136. The force necessary to compress the Belleville washer subassembly to the point where the three-way valve reestablishes the equilibrium position of first valve element 82, also determines the delivered pressure because, when this condition exists, no more fluid can enter the pilot control pressure chamber and the pressure therein remains substantially constant. The lower piston 58 will also have assumed the position shown in FIG. 1 of the drawings shutting off the main flow control valve 12 because of the balanced pressure on both sides thereof assuming, of course, no downstream fluid consumption. The secondary pressure existing at this particular adjusted position of first valve element 82 is that which appears by the index mark on pressure scale 190 and the same is true of all other adjusted positions of this valve element. A condition now exists where the main flow control valve has reclosed and the secondary pressure has risen to the preselected value determined by the setting of the control knob in relation to the pressure scale 190.

Next, assume that a fluid-consuming load is actuated downstream of the regulator. The secondary pressure will immediately drop and produce a pressure differential across lower piston 58 acting in a direction to depress same thus, once again, opening the main valve 12 and supplying the downstream demand. As long as the load remains on the line, the main valve will stay open to supply same because piston 58 will be occupying a different equilibrium position lower down in the walled cavity 16. Obviously, as the lower piston drops down slightly due to the lesser secondary pressure therebeneath in the controlled pressure chamber, the control pressure in the pilot control pressure chamber 132 will also drop momentarily because of the greater volume between the pistons; however, as soon as the control pressure drops, the Belleville washer subassembly will act to lower the upper piston 86 because the biasing force of the fluid in the pilot control pressure chamber is no longer adequate to keep this subassembly at the same degree of deflection. Accordingly, the three-way valve has, once again, returned to the position shown in FIG. 4 where third valve element 84 has moved down carrying second valve element 76 therewith and away from first valve element 82 which stays in its same adjusted position. Fluid, therefore, is once again admitted to the pilot control pressure chamber past first valve element 82 until the preset pilot control pressure is restored therein at the greater volume and the upper piston moves up again to its former equilibrium position shown in FIG. 5. Obviously, the only way the pressure in the pilot control pressure chamber can stay constant at its preset level is to have the lower piston steady in a condition of equilibrium which means that the secondary pressure is back up to the indicated pressure on the dial setting.

Next, the condition will be examined in which all or part of the downstream load is taken off the line. An instantaneous increase in the secondary or delivered pressure will occur which will be communicated to the underside of lower piston 58 through siphon tube 200 and controlled pressure chamber "C" that will raise said piston and compress the fluid in the pilot control pressure chamber until equilibrium is restored at the higher pressure. The higher pressure in the pilot control pressure chamber will, of course, also raise the upper piston 86 in opposition to the downwardly directed bias exerted thereon by the Belleville washer subassembly. As the upper piston is elevated, the three-way valve will assume the condition illustrated in FIG. 6 wherein third valve element 84 thereof has moved off of the frustoconical surface 88 of second element 76 thus exhausting fluid into ambient pressure chamber "O" out into the atmosphere from the pilot control pressure chamber through passage 142, annular space 146, port 150 in the upper piston hub, Belleville washer cavity 148, exhaust port 140 in the top of the cap forming element and finally out underneath the control knob. When the lower piston 58 first raised up due to the increase in pressure therebeneath, the main valve will have closed some due to the bias exerted on element 44 thereof by compression spring 40 thus diminishing the flow. As soon as the pressure in the pilot control pressure chamber has been restored to its preset level as determined by the adjusted position of first valve element 82, the three-way valve will have returned to its equilibrium position shown in FIG. 5 with the upper piston and its third valve member 84 at the preset equilibrium position but with the lower piston 58 at a new equilibrium position holding the main valve 12 open the lesser amount necessary so that the flow therepast will satisfy the diminished downstream requirements and restore the selected secondary pressure to the system.

It should also be noted that, under some circumstances, the sudden removal of a fluid-consuming load from the line can cause a momentary surge in secondary pressure to a level which exceeds that counterbalanced by the control pressure within the pilot control pressure chamber. Both the FIG. 1 and FIG. 7 versions of the instant regulator react to the instantaneous back pressures by raising the lower piston to the point where the main flow control valve closes and then further until it unseats from the valve stem thus acting as a relief valve to dump the excess pressure directly to the atmosphere around the pilot control valve 78 or plug 202 as the case may be. Of course, the momentary upward movement of the lower piston will also bring about a corresponding decrease in the volume and an elevation of the pressure in the pilot control pressure chamber so as to compress the Belleville washer subassembly and bring about the previously described condition shown in FIG. 6 where the excess pressure is dumped therefrom. Then, once the surge has thus dissipated itself, the opposite condition will exist where both the secondary and control pressure will be below normal thus bringing the FIG. 4 condition into play until equilibrium is again restored.

Figures 4, 5:
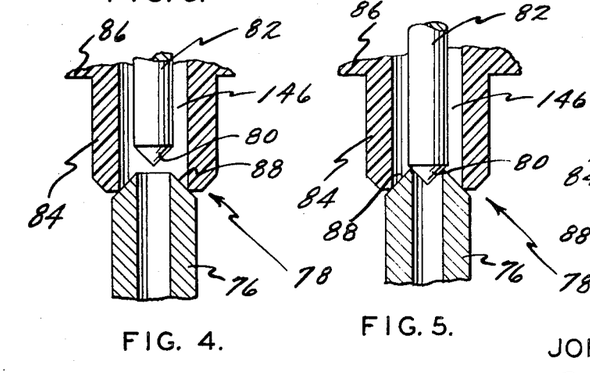
FIG. 4 is a fragmentary diametrical section to an enlarged scale showing the position occupied by the elements of the three-way pilot control valve when the control has dropped below its preset valve.
FIG. 5 is a fragmentary diametrical section similar to FIG. 4 except that the elements of the three-way pilot control valve are shown in their equilibrium positions indicating that the control pressure is at the level required to maintain the secondary pressure at its preset value.
Figure 6:
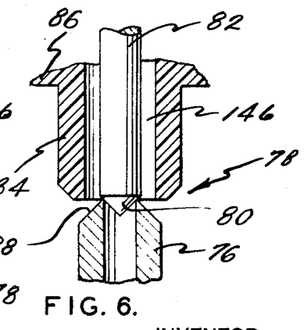
FIG. 6 is a fragmentary diametrical section similar to FIGS. 4 and 5 except that the elements of the three-way pilot control valve are shown in the positions they occupy when the control pressure has risen above the level required to keep the secondary pressure at it preset value; and, FIG. 7 is a diametrical section similar to FIG. 1 illustrating a modified form of the regulator in which the pilot and main sections of the pressure-responsive valve actuating mechanism are separated from one another and housed in different casings functionally interconnected by fluid lines.

Summarizing the above, whenever the conditions in the system are such that the secondary pressure is at its preselected value, the three-way valve will occupy the equilibrium position of FIG. 5 as will the upper piston 86 which carries one part of said valve although as previously noted the position of the lower piston in relation to the upper will vary with the downstream conditions. At any time the secondary pressure rises above the preselected value, the control pressure in the pilot control pressure chamber will, likewise, rise above its equilibrium value causing the three-way valve to assume the FIG. 6 condition until equilibrium is, once again, restored. Finally, should the secondary pressure fall below the preset value, the three-way valve will respond to this unbalanced condition as in FIG. 4 until equilibrium is again present.

It will thus become apparent that whatever factor is responsible for changing the control pressure in the pilot control pressure chamber, whether it be fluctuations in secondary pressure as the downstream load varies or even leakage of fluid from the pilot chamber itself, three-way control valve 78 senses such change and automatically compensates therefor by either bleeding of fluid in the case of an excessively high pressure or adding fluid to restore it to the preset level. As previously mentioned, the dial scale 190 is calibrated in accordance with the Belleville washer subassembly or similar biasing means such that the control pressure within the pilot control pressure chamber at any given setting of adjustable element 82 of the control valve will maintain the delivered pressure within 3 percent or less of its indicated value.

Finally, with brief reference once again to FIG. 7, it will be apparent that the three-way valve 78 responds to and controls the pressure in the pilot control pressure chamber in exactly the same way as has just been described in connection with the FIG. 1 modification. The fact that the pilot control chamber is separated into two sections 132a and 132b interconnected by conduit 212 has no effect on the functioning of the regulator as the pneumatic servomotors that include the upper and lower pistons respond to fluctuations in control pressure just the same way as if the chamber were a unitary one. The ability to separate the regulator into two functionally interconnected sections makes it possible to bring the control of several regulators located at widely diverse locations to a central control station.

What is claimed is:

1. A regulator for controlling the delivered pressure in a fluid line which comprises: a body having a flow passage therethrough that includes an inlet at the upstream end thereof connectable to a source of fluid under pressure and an outlet at the downstream end adapted for connection to a fluid-consuming load; main normally closed flow control valve means located within the body between the inlet and outlet dividing the interior thereof into a primary pressure chamber on the upstream side and a secondary pressure chamber downstream, said valve means being operative upon actuation to open and control the flow of fluid from said primary pressure chamber into the secondary one; first servomotor means operative to actuate the flow control valve means in response to fluctuations in pressure within the secondary pressure chamber, said first servomotor means including a walled cavity and defining therein a controlled pressure chamber of variable volume in open communication with said secondary pressure chamber and a first pressure-responsive means operatively connected to the flow control valve means and mounted for movement within said walled cavity; second servomotor means operative to control the first servomotor means in response to fluctuations in a preset control pressure, said second servomotor means including a second pressure-responsive means mounted within the walled cavity for movement therein relative to the first pressure-responsive means while cooperating therewith to define a pilot control pressure chamber of variable volume, and biasing means preloading said second pressure-responsive means in a direction to decrease the volume in said pilot control pressure chamber; fluid passage means connected to deliver fluid from the primary pressure chamber to the pilot control pressure chamber and to bleed fluid from the pilot control pressure chamber to the exterior of the body; and pilot control valve means associated with the fluid passage means and the second pressure-responsive means operative to establish and automatically maintain a control pressure within the pilot control pressure chamber at a selected preset level, said pilot control valve means including a first valve element located in the fluid passage means and mounted for adjustable movement relative to the second pressure-responsive means, a second valve element located in the fluid passage means and normally biased into seated position against said first valve element while cooperating therewith to shut off the supply of fluid to the pilot control pressure chamber, and a third valve element located in the fluid passage means for movement with the second pressure responsive means under the influence of the biasing means into seated position against said second valve element while cooperating therewith to shut off the escape of fluid from the pilot control pressure chamber, each adjusted position of said first valve element defining an equilibrium position wherein a specific control pressure is established within the pilot control pressure chamber, the second and third valve elements cooperating upon a decrease in control pressure below the preset value to move as a unit relative to the first valve element under the influence of the biasing means in the direction to open the fluid passage means and admit fluid to the pilot control pressure chamber until equilibrium is restored, and said third valve element being operative upon an increase in control pressure above the preset value to move relative to said first and second valve elements in the direction to oppose the preload bias exerted by the biasing means so as to open the fluid passage means and bleed fluid from the pilot control pressure chamber until equilibrium is restored therein.

2. The fluid pressure regulator as set forth in claim 1 in which: the walled cavity is divided into three sections, the first forming a part of the body and housing the first pressure-responsive means, the second being separated from the first and housing the second pressure responsive means, and the third comprising a conduit connected between said first and second sections so as to establish open communication therebetween.

3. The fluid pressure regulator as set forth in claim 2 in which: the pilot control valve means is located within the second section of the walled cavity.

4. The pressure regulator as set forth in claim 1 in which: the body is separated into two sections, the first comprising a main section housing the first servomotor means and the second comprising a pilot section housing the second pressure-responsive means of the second servomotor means, the biasing means and the pilot control valve means; and the pilot control pressure chamber comprises cavities within the main and pilot body sections and a conduit interconnecting said main and pilot body section cavities.

5. The fluid pressure regulator as set forth in claim 1 in which: the first valve element is rotatably adjustable: indicating means is fastened to the first valve element for rotational movement therewith; and scale means is located and calibrated to cooperate with said indicating means to provide a visual indication approximating the delivered pressure corresponding to any preset control pressure established by a particular setting of the pilot control valve means.

6. The fluid pressure regulator as set forth in claim 5 in which: the indicating means includes a first stop means movable therewith; and a second stop means is mounted for movement relative to the scale means, said second stop means cooperating with the first to limit the degree of rotation of the first valve element in one direction or the other so as to establish a maximum or minimum delivered pressure in each adjusted position.

7. The fluid pressure regulator as set forth in claim 5 in which: the indicating means includes a first stop means movable therewith; and a fixed stop is located in the path of said first stop means, said fixed stop and first stop means cooperating with one another to limit the rotation of the first valve element to single revolution.

8. The fluid pressure regulator as set forth in claim 7 in which: the fixed stop means forms a part of the scale means; the scale means is rotatably adjustable relative to the body; and the first stop means is operative to engage the fixed stop means and rotate the scale relative to the body upon rotation of the indicating means.

9. The fluid pressure regulator as set forth in claim 8 in which: the indicating means is turned past its lowest scale position in the direction to decrease the delivered pressure.

10. The fluid pressure regulator as set forth in claim 5 in which: the first valve element is threaded so as to provide for axial adjustment upon rotation, the pitch of said threads being selected to cooperate with the biasing means so as to define a range of control pressures upon rotation of said first valve element up to one complete revolution.

11. The fluid pressure regulator as set forth in claim 1 in which: the first and second pressure-responsive means comprise pistons mounted for relative reciprocating movement within the walled cavity.

12. The fluid pressure regulator as set forth in claim 1 in which: the first and second pressure-responsive means include opposed axially directed tubular portions arranged one inside the other for relative telescoping movement in fluidtight sealed relation, said tubular portions cooperating with one another to define an ambient pressure chamber forming part of the fluid passage means.

13. The fluid pressure regulator as set forth in claim 12 in which: the main flow control valve means includes a valve stem mounted within the wall of the body separating the primary pressure chamber and the controlled pressure chamber for reciprocating movement in fluidtight sealed relation thereto; and the first pressure-responsive means is removably seated against the stem of said flow control valve means so as to cooperate therewith to define a fluidtight seal separating the controlled pressure chamber from the ambient pressure chamber, said first pressure-responsive means being operative upon an increase in delivered pressure above the preset value with the main flow control valve means closed to unseat from said valve stem and dump the excess fluid into the ambient pressure chamber until said preset pressure is restored.

14. The fluid pressure regulator as set forth in claim 1 in which: the main flow control valve means includes a valve stem mounted within the wall separating the primary pressure chamber from the controlled pressure chamber for reciprocating movement in fluidtight sealed engagement therewith; the first pressure-responsive means including a tubular portion and an apertured seat normally resting atop the stem of the main flow control valve means in fluidtight sealed engagement therewith; and the second pressure-responsive includes means attached thereto, said means including a tubular portion within the pilot control pressure chamber arranged in fluidtight telescoped relation to the tubular portion of the first pressure-responsive means and cooperating therewith to define an ambient pressure chamber open to the atmosphere, said first pressure-responsive means being operative in response to an increase in pressure within the controlled pressure chamber above a predetermined value to release the main flow control valve into closed position and unseat from the valve stem so as to dump the excess fluid from said controlled pressure chamber into the ambient pressure chamber.

15. The fluid pressure regulator as set forth in claim 1 in which: the third valve element comprises a tubular member movable with the second pressure-responsive means, the interior of said tubular member being in open communication with the interior of the pilot control pressure chamber.

16. The fluid pressure regulator as set forth in claim 1 in which: the body is separated into two sections, the first comprising a main section housing the first pressure-responsive means and the second housing the second pressure-responsive means; the main flow control valve means includes a valve stem mounted within the wall separating the primary pressure chamber from the controlled pressure chamber for reciprocating movement in fluidtight sealed engagement therewith; the first pressure-responsive means including a tubular portion and an apertured seat normally resting atop the stem of the main fluid control valve means in fluidtight sealed engagement therewith; the pilot control pressure chamber comprises cavities within each body section between the pressure-responsive means and a conduit connected therebetween; and means within the pilot control pressure chamber in fluidtight sealed attachment to the walled cavity, said means including a tubular portion arranged in fluidtight telescoped relation to the tubular portion of the first pressure-responsive means and cooperating therewith to define a first ambient pressure chamber open to the atmosphere, said first pressure-responsive means being operative in response to an increase in pressure within the controlled pressure chamber above a predetermined value to release the main flow control valve into closed position and unseat from the valve stem so as to dump the excess fluid from said controlled pressure chamber into the first ambient pressure chamber.

17. The fluid pressure regulator as set forth in claim 16 in which: the pilot control valve means is located within the second body section; the second pressure-responsive means includes an inner tubular portion defining the third valve element and an outer tubular portion encircling the inner one; and the second body section has a tubular portion cooperating in telescoped fluidtight relation with the outer tubular portion of the second pressure-responsive means to define a second ambient pressure chamber forming a part of the fluid passage means.

* * * * *